(12) United States Patent
Adamec et al.

(10) Patent No.: US 6,211,773 B1
(45) Date of Patent: *Apr. 3, 2001

(54) REMOTE CONTROL DEVICE AND METHOD FOR ELECTRONIC PRICE LABEL SYSTEMS

(75) Inventors: Andrew J. Adamec; John F. Crooks, both of Duluth, GA (US)

(73) Assignee: NCR Corporation, Dayton, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/992,749

(22) Filed: Dec. 17, 1997

(51) Int. Cl.[7] .................................................. G06F 7/12
(52) U.S. Cl. ......................... 340/5.91; 235/383; 714/812
(58) Field of Search ..................... 340/825.35, 825.22, 340/825.69, 825.72, 5.91; 235/383; 714/812; 700/3, 19, 27, 40; 455/45; 705/20, 21; 709/208, 209; 345/2; 358/296

(56) References Cited

U.S. PATENT DOCUMENTS

| | | |
|---|---|---|
| 4,002,886 | 1/1977 | Sundelin ............................. 235/383 |
| 4,500,880 | 2/1985 | Gomersall et al. ............. 340/825.35 |
| 4,924,363 | 5/1990 | Kornelson ............................. 362/125 |
| 5,172,314 | 12/1992 | Poland et al. .......................... 705/26 |
| 5,309,351 * | 5/1994 | McCain ................................... 700/3 |
| 5,448,226 | 9/1995 | Failing, Jr. et al. ............ 340/825.35 |
| 5,493,408 * | 2/1996 | Kurogane ............................. 358/296 |
| 5,640,683 * | 6/1997 | Evans ..................................... 455/45 |
| 6,035,437 * | 3/2000 | Adamec ................................ 714/812 |

* cited by examiner

Primary Examiner—Edwin C. Holloway, III
(74) Attorney, Agent, or Firm—Paul W. Martin

(57) ABSTRACT

A remote control device and method for electronic price label (EPL) systems which includes circuitry from EPLs. The remote control device includes a first EPL circuit, a second EPL circuit, and a control circuit coupled between the first and second EPL circuits for enabling transmission of alternating signals to the EPL computer by the first and second EPL circuits. The EPL computer executes a function in response to the alternating signals.

11 Claims, 4 Drawing Sheets

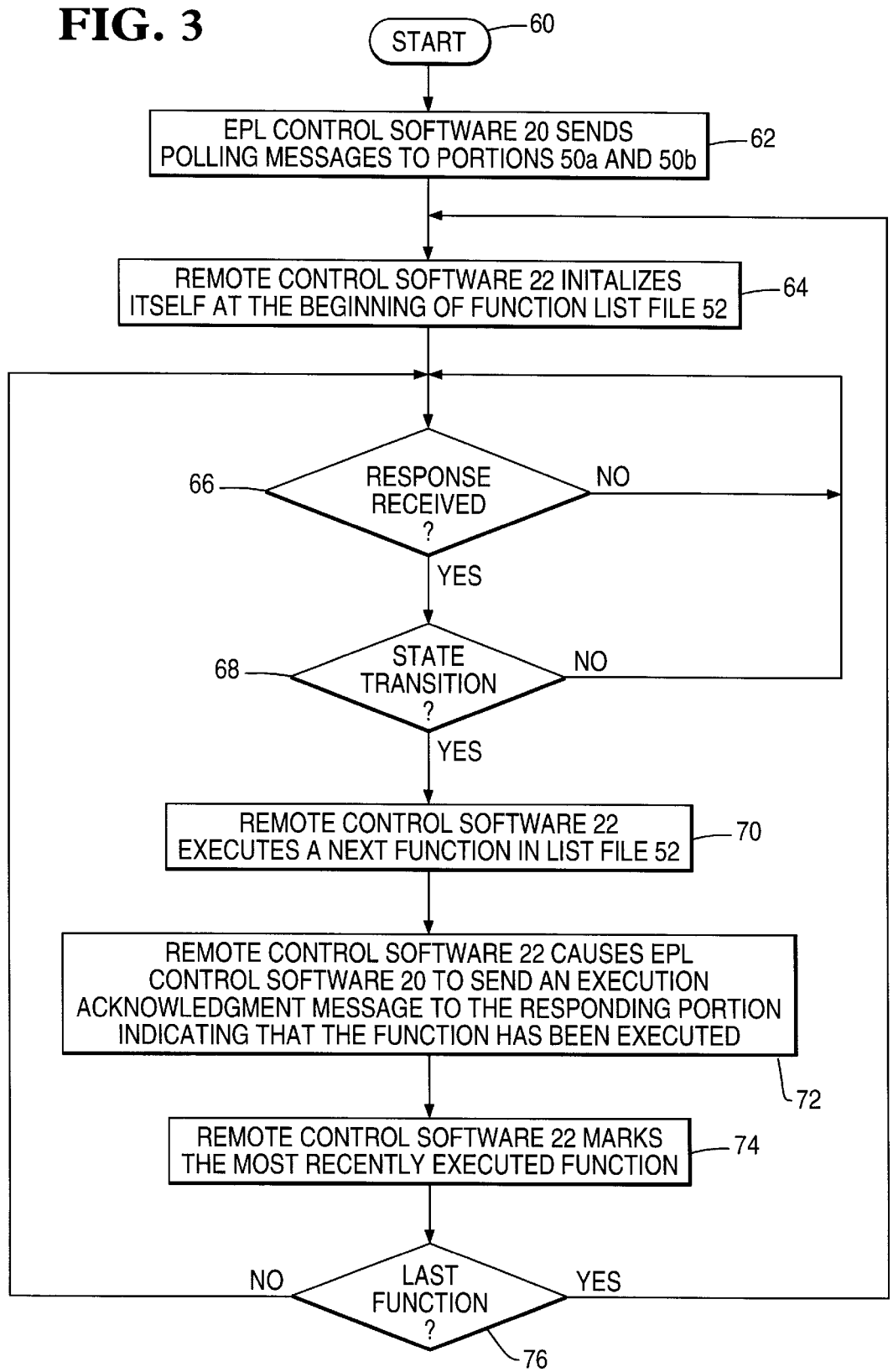

REMOTE CONTROL DEVICE AND METHOD FOR ELECTRONIC PRICE LABEL SYSTEMS

CROSS-REFERENCE TO RELATED APPLICATIONS

The present invention is related to commonly assigned U.S. application Ser. No. 08/992,667, now U.S. Pat. No. 6,035,437, entitled, "Communication Device and Method for Electronic Price Label Systems", filed Dec. 17, 1997, and invented by Adamec, now U.S. Pat. No. 6,035,437.

BACKGROUND OF THE INVENTION

The present invention relates to electronic price label (EPL) systems used in transaction establishments, and more specifically to a remote control device and method for EPL systems.

EPL systems typically include a plurality of EPLs for each merchandise item in a store. EPLs typically display the price of corresponding merchandise items on store shelves and are typically attached to a rail along the leading edge of the shelves. A store may contain thousands of EPLs to display the prices of the merchandise items. The EPLs are coupled to a central server from where information about the EPLs is typically maintained in an EPL data file. Price information displayed by the EPLs is obtained from the PLU file.

EPLs today may be wired or wireless. Wireless EPLs may employ infrared or radio frequency (RF) transmitters. EPLs systems of the assignee of the present invention employ RF transmitters and modulated backscatter techniques. An EPL computer transmits polling signals to one or more EPLs. In order to respond to the poll, an EPL "reflects" the polling signal back to the EPL computer within a predetermined time interval of receiving the polling signal. A good analogy of the RF modulated backscatter acknowledgment signal is a mirror reflection. If two men face each other, one with a flashlight and the other with a mirror, the man with the mirror can send an acknowledgment to the man with the flashlight by reflecting the beam of light back to him. Similarly, the man with the mirror may indicate the opposite by not reflecting the light of the flashlight.

Modulated backscatter techniques are taught in U.S. Pat. No. 5,640,683, to Evans et al., entitled "Modulated Backscatter Wireless Communication System Having An Extended Range", issued Jun. 17, 1997. This patent is hereby incorporated by reference.

Remote control of a host EPL computer system would be desirable anytime the EPL system installer, user, or administrator is performing EPL related tasks away from the host EPL computer.

One such task that might be performed by an EPL system installer is a coverage test. The coverage test determines the area in a transaction establishment in which communication between a number of receiver-transmitters is possible. The test identifies potential problem coverage areas of the transaction establishment by analyzing the signal and noise pairs of special EPLs. Normally, the installer must move a panel of EPLs to the physical location in the store that he wants to analyze. Next, he walks to the host computer to initiate the test. Moving of the EPLs and initiating the next test at the host must be repeated for each location. This procedure is time consuming and inconvenient because the operator must spend time traversing the store between the host computer and the coverage test areas.

Hand-held terminals have been developed which communicate with the EPL computer, effectively allowing remote communication with the host processor. However, these terminals are costly and can introduce noise that may interfere with the EPL system. When a hand-held terminal device is introduced that does not share the same communication protocol or hardware as the EPL system, there is some likelihood that the device will interfere with existing EPL system communication. In order to avoid interference, the EPL system must sacrifice performance by giving up radio frequency bandwidth to the device.

Therefore, it would be desirable to provide a remote control device and method for EPL systems that would allow an operator to remotely control the EPL computer from anywhere in a store using the existing EPL infrastructure.

SUMMARY OF THE INVENTION

In accordance with the teachings of the present invention, a remote control device and method for EPL systems is provided.

The remote control device includes a first EPL circuit, a second EPL circuit, and a control circuit coupled between the first EPL circuit and the second EPL circuit for enabling transmission of alternating signals to the EPL computer by the first EPL circuit and the second EPL circuit. The EPL computer executes a function in response to the alternating signals.

The function is preferably identified by a function list maintained by the EPL computer. The EPL computer executes functions sequentially in response to the alternating signals.

Thus, a method of remotely causing an electronic price label (EPL) computer to execute a function includes the steps of transmitting alternating signals from first and second EPL circuits to the EPL computer, and executing the function by the EPL computer in response to receipt of the alternating signals.

It is accordingly an object of the present invention to provide a remote control device and method for EPL systems.

It is another object of the present invention to provide a remote control device and method for EPL systems which would allow an operator to remotely control an EPL computer from anywhere in a store.

It is another object of the present invention to provide a remote control device and method for EPL systems that utilizes the existing EPL infrastructure.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

FIG. 3 is a flow diagram illustrating the remote control method of the present invention.

DETAILED DESCRIPTION OF THE PREFERRED EMBODIMENT

Figure 1:
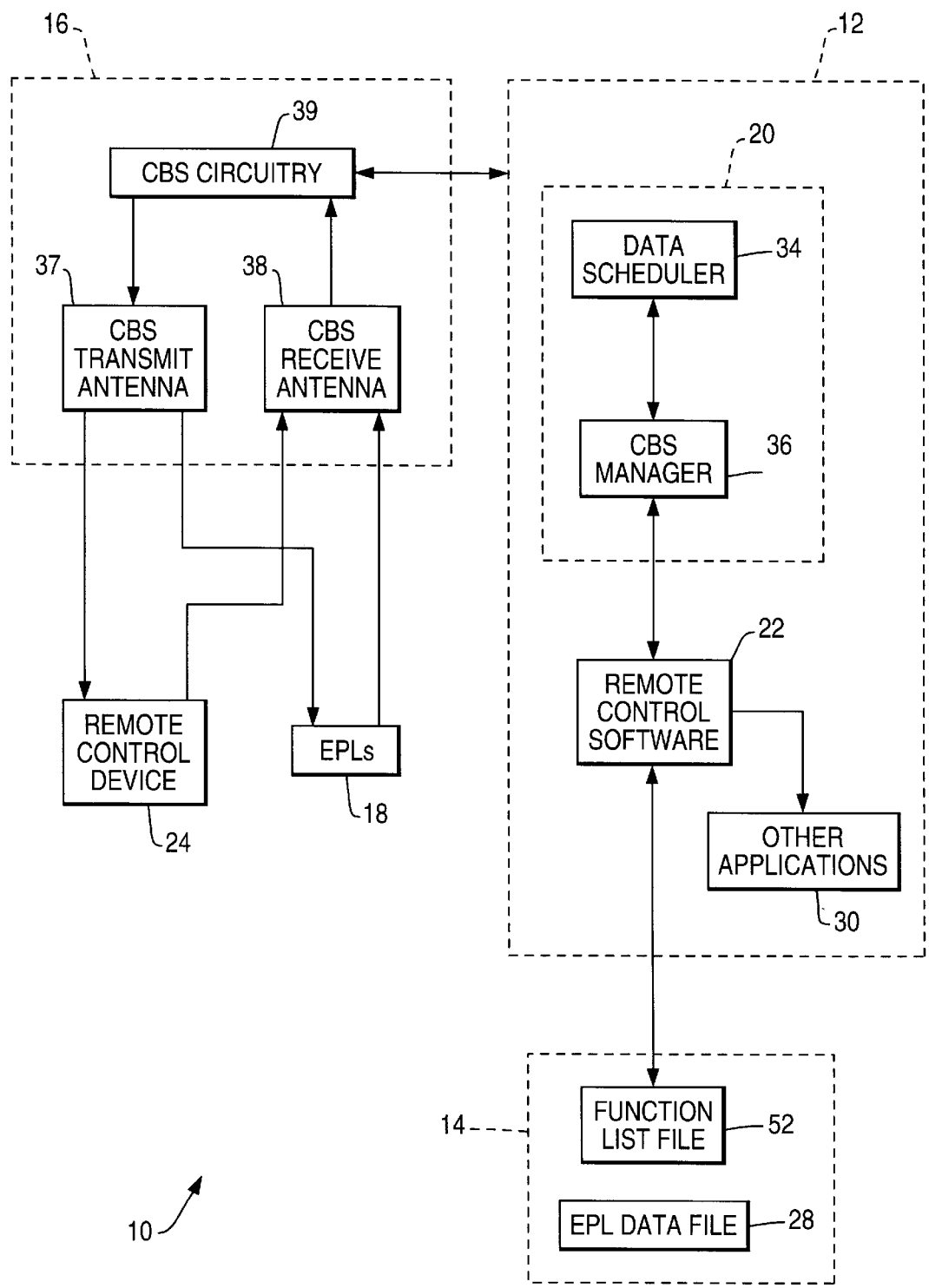
FIG. 1 is a block diagram of an EPL system.

Referring now to FIG. 1, EPL system 10 includes computer 12, storage medium 14, communication base station (CBS) 16, electronic price labels (EPLs) 18, and remote control device 24. EPL system 10 makes use of modulated backscatter communication techniques.

Computer 12 executes EPL control software 20, remote control software. 22, and other applications 30. EPL control software 20 records, schedules, and transmits all messages to EPLs 18 and device 24 through CBS 16, and receives and analyzes messages from EPLs 18 and device 24 through CBS 16.

Figure 2A:
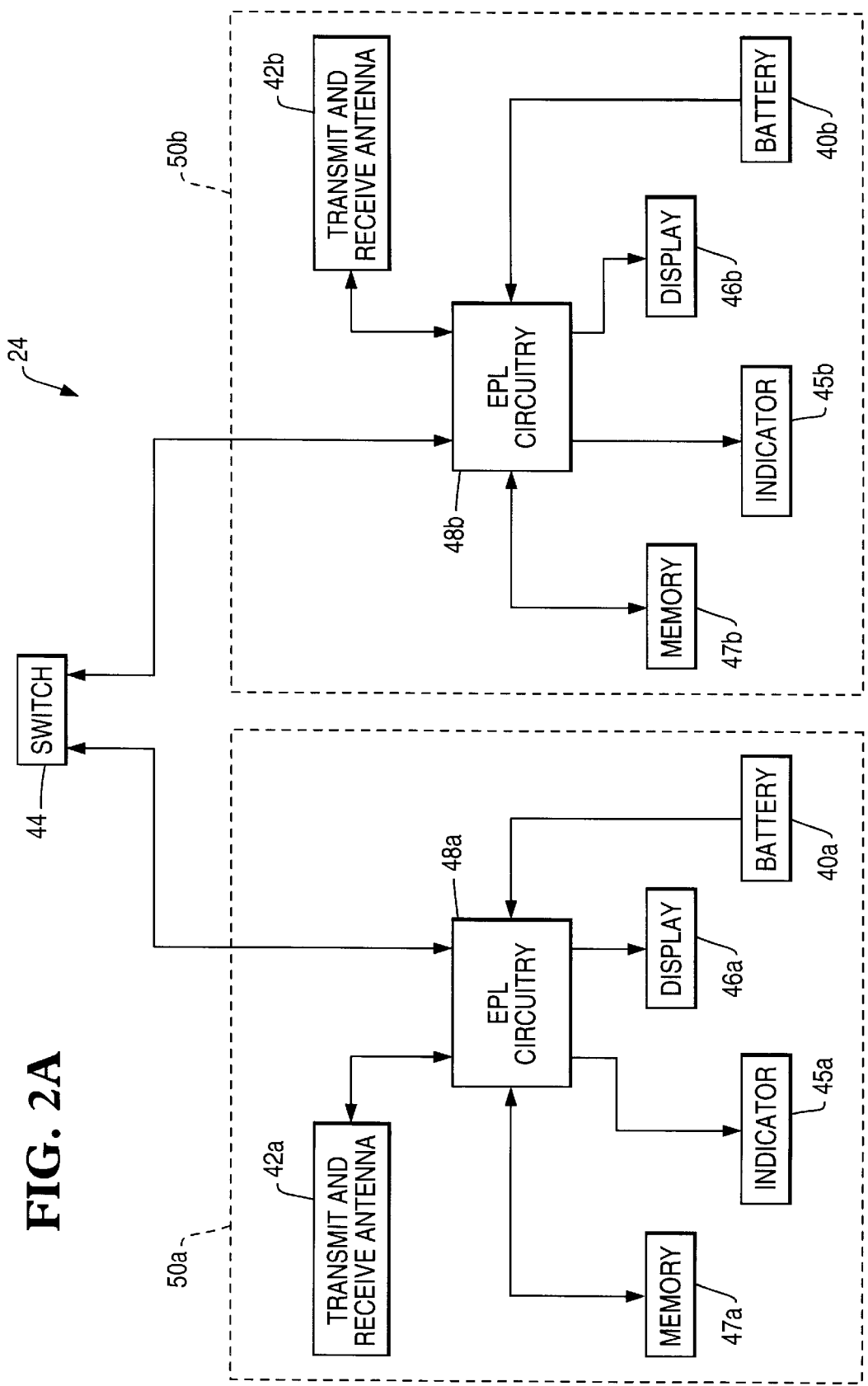
FIGS. 2A and 2B are block diagrams of a remote control device in accordance with the present invention.
Figure 2B:
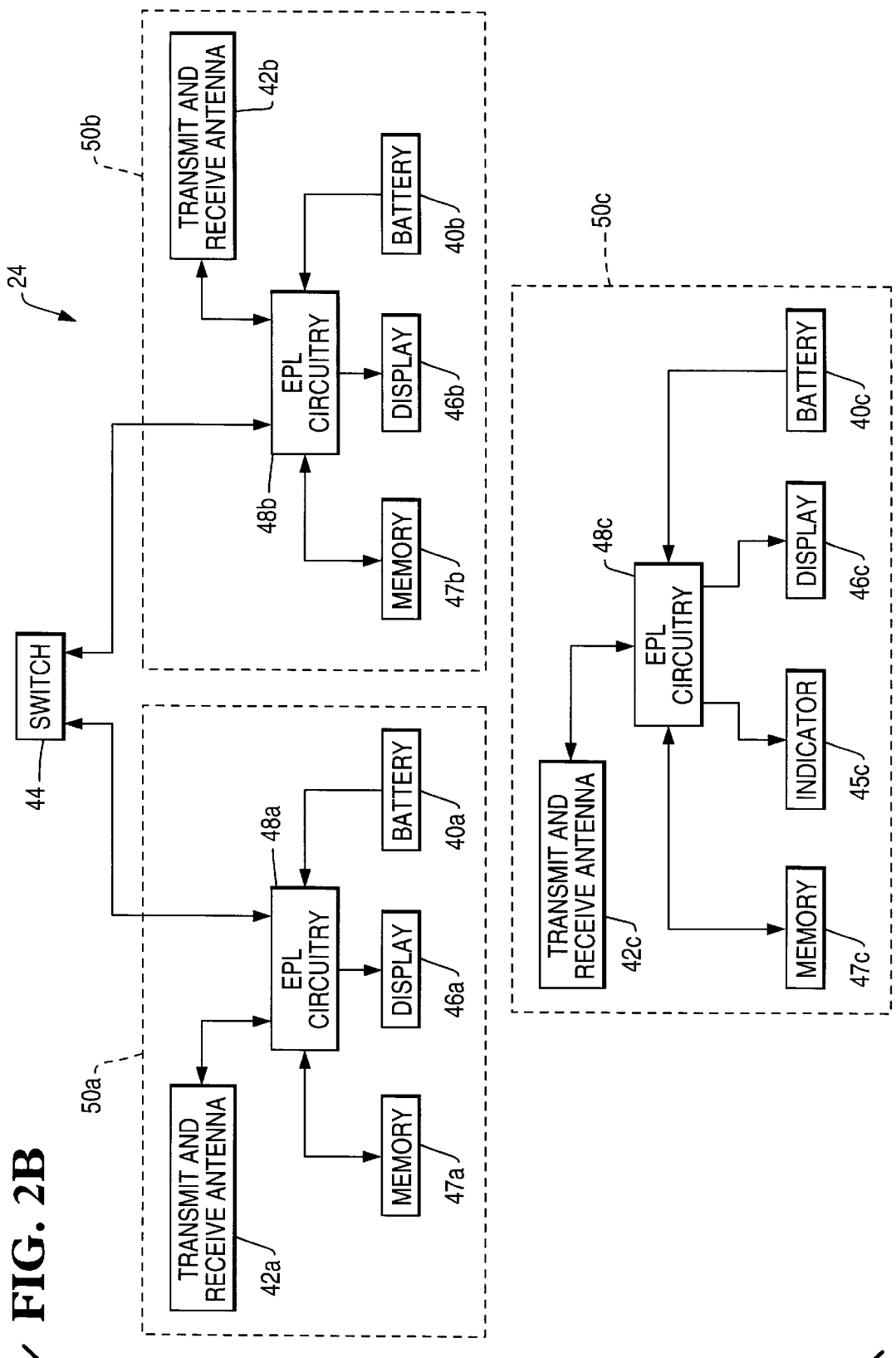

EPL control software 20 maintains and uses EPL data file 28. EPL data file 28 contains item information, EPL identification information, and status information for each of EPLs 18 and portions 50a and 50b of device 24 (FIGS. 2A and 2B).

EPL control software 20 primarily includes data scheduler 34 and CBS manager 36. Data scheduler 34 schedules EPL price change messages to be sent to EPLs 18 through CBS 16. Data scheduler 34 schedules polling and EPL computer acknowledgment messages to be sent to device 24 through CBS 16.

Remote control software 22 causes EPL control software 20 to poll device 24 and uses the responses received from device 24 to signal EPL computer 12 to perform predetermined sequential functions in function list file 52. Such functions include gathering signal and noise data, starting or stopping a promotion or a group of promotions, signaling EPL computer 12 to perform a diagnostic test on CBS 16 while a technician physically examines CBS 16 where it is mounted in a ceiling, turning on and off EPL electronic signage. All of these functions are simple on/off or start/stop functions.

Remote control software 22 calls other applications 30 and/or EPL control software 30 to perform the functions. For this purpose, remote control software 22 may be implemented as a batch file.

Functions for different processes may be grouped together to produce multiple function list files 52 that may be selected by a technician prior to starting a procedure. Also, multiple remote control devices 24 may be used together to simultaneously control the starting and stopping of different functions through multiple function list files 52. For instance, one remote control device might control the starting/stopping of the polling for all of the other remote control devices to free up some bandwidth for other normal EPL communication, such as price updates. Other remote control devices may be used for starting/stopping sales promotions, starting diagnostic tests, and gathering signal and noise data for coverage tests. In order to minimize any negative impact on system performance from such a system, the remote control device requests would be assigned a low priority.

Storage medium 14 is preferably a fixed disk drive. Storage medium 14 stores EPL data file 28 and function list file 52.

CBS 16 preferably includes one transmit antenna 37 and up to four receive antennas 38 for transmitting and receiving messages between CBS 16 and EPLs 18 and between CBS 16 and device 24. CBS 16 includes CBS circuitry 39 which controls operation of CBS 16. EPL system 10 preferably includes a plurality of CBSs 16 connected together in series.

CBS manager 36 schedules transmission of price change messages to EPLs 18 and polling messages to device 24. CBS manager 36 controls reception of status messages from EPLs 18 and control messages from device 24 for predetermined time slots.

Turning now to FIGS. 2A and 2B, first and second embodiments of device 24 are illustrated.

Device 24 is a combination of the components of two EPLs represented as portions 50a and 50b. Each portion has an EPL identification number to which EPL computer 12 addresses messages. Portions 50a and 50b may be combined into a single housing. Alternatively, portions 50a and 50b may be left as separate EPLs coupled by an externally-mounted enabling switch 44.

Portion 50a includes battery 40a, transmit and receive antenna 42a, indicator 45a, display 46a, memory 47a, and EPL circuitry 48a.

Portion 50b includes battery 40b, transmit and receive antenna 42b, indicator 45b, display 46b, memory 47b, and EPL circuitry 48b.

Batteries 40a and 40b provide power to device 24.

Transmit and receive antennae 42a and 42b transmit device acknowledgment messages from portions 50a and 50b and receives polling and EPL computer acknowledgment messages from EPL computer 12. Since device 24 is made from EPLs like EPLs 18, it operates in the same frequency range.

Displays 46a and 46b are preferably liquid crystal displays (LCDs).

Displays 46a and 46b are preferably used by EPL computer 12 to signal an operator that EPL computer 12 has executed a desired function in response to a command message from device 24. Activation of displays 46a and 46b is preferably controlled by storing a "display acknowledgment" setting in EPL data file 28. EPL computer 12 reads EPL data file 28 and sends an execution acknowledgment message to device 24 containing a command to display an acknowledgment in accordance with the settings in EPL data file 28.

Indicators 45a and 45b are preferably an optional alternative or addition to displaying of acknowledgments by displays 46a and 46b. Indicators 45a and 45b may include self-contained electronic beepers, lights, or tactile indicators. EPL computer 12 stores an "activate indicator" setting in EPL data file 28 and may also store control settings for indicators 45a and 45b. EPL computer 12 reads EPL data file 28 and sends an execution acknowledgment message to device 24 containing a command to indicate an acknowledgment in accordance with the settings in EPL data file 28.

Since widely-used EPLs do not include indicators, the present invention also envisions a combination of two widely-employed EPLs in the manner stated above and one specially-configured EPL, which contains an indicator 45c (FIG. 2B). EPL computer 12 addresses execution acknowledgment messages only to the specially-configured EPL, referenced as portion 50c. In addition to indicator 45c, specially-configured EPL 50c includes battery 40c, transmit and receive antenna 42c, display 46c, memory 47c, and EPL circuitry 48c, all of which have similar functions as the components of portions 50a and 50b.

The specially-configured EPL 50c need not be electrically coupled to the other two EPLs 50a and 50b. The components of the specially-configured EPL 50c may be combined with the components of the widely-employed EPLs 50a and 50b into a single housing, or left as a separately housed unit.

Memories 47a and 47b store messages from EPL computer 12.

EPL circuitries 48a and 48b control the internal operation of portions 50a and 50b. EPL circuitries 48a and 48b store received messages from EPL computer 12 and transmits response messages to EPL computer 12. EPL circuitries 48a and 48b control indicators 45a and 45b and the display of acknowledgment information by displays 46a and 46b, including blinking.

Switch 44 enables either EPL circuitry 48a or 48b. To an operator, each switching action signifies a function to be performed by EPL computer 12. Thus, each switch position signifies a state and a state transition causes the next function to be executed in function list 52 to be executed.

The number of states is preferably equal to the number of portions within device 24 less one, rather than the number of portions, since one of portions 50a and 50b within device 24 indicates an "idle" state. The "idle" state is the state that just previously initiated the prior function.

Turning now to FIG. 3, the operation of remote control software 22 is illustrated in more detail, beginning with START 60.

In step 62, EPL control software 20 sends polling messages to portions 50a and 50b.

In step 64, remote control software 22 initializes itself at the beginning of function list file 52. If multiple function list files exist, a technician may select on or more function list files as being active for the process to be performed by the technician.

In step 66, EPL control software 20 waits for either of portions 50a or 50b to transmit a good acknowledgment. In modulated backscatter systems, the word "transmit" as used in connection with EPLs should be understood to connote "reflection". Thus, an EPL computer 12 in a modulated backscatter system polls portions 50a and 50b and receives a reflected signal from either portion 50a or 50b, as determined by the position of switch 44.

If a good acknowledgment is not received from either of portions 50a or 50b, operation returns to step 64 to continue polling. If a good acknowledgment is received from one of portions 50a or 50b, operation proceeds to step 68.

In step 68, remote control software 22 determines whether a state transition occurred. If remote control software 22 is operating at the beginning of function list file 52, remote control software 22 treats a response from portion 50a as a state transition to perform the first function.

In step 70, remote control software 22 executes a next function in list file 52. When the process is started, the first function is the "next" function.

In step 72, remote control software 22 causes EPL control software 20 to send an execution acknowledgment message to the responding portion. After the responding portion receives the message, its indicator or display alerts the operator that the function has been executed. For the embodiment in FIG. 2B, EPL control software 22 sends all execution acknowledgment messages to portion 50c.

In step 74, remote control software 22 marks the function in function list file 52 as completed.

In step 76, determines whether the most recently executed function is the last function in function list file 52. If not, operation returns to step 66 to await the next response from device 24. The next time an acknowledgment is received from a portion 50a or 50b different than the most recently responding portion 50a or 50b, remote control software 22 executes the next function in list 52. In this way, remote control software 22 sequentially steps through function list file 52 each time remote control device 24 sends an alternating acknowledgment.

If the most recently executed function is the last function in function list file 52, then operation returns to step 64 to await the next run through function list file 52. Alternatively, polling may be discontinued when a technician stops execution of remote control software 22 or when the sequence of functions in function list file 52 has been completed.

Although the present invention has been described with particular reference to certain preferred embodiments thereof, variations and modifications of the present invention can be effected within the spirit and scope of the following claims.

What is claimed is:

1. An electronic price label (EPL) system comprising:
   a remote control device including a first EPL circuit, a second EPL circuit, and a control circuit coupled between the first EPL circuit and the second EPL circuit for enabling alternating communication of first and second signals by the first and second EPL circuits;
   a computer which maintains a function list containing a number of functions and which executes the functions sequentially upon alternating receipt of the first and second signals; and
   communication circuit which facilitates communication between the computer and the remote control device.

2. The system as recited in claim 1, wherein the control circuit comprises a switch for selecting transmission of the first signal or the second signal.

3. The system as recited in claim 1, wherein the remote control device further comprises an indicator which indicates to an operator that EPL computer has received the first and second signals and executed the functions.

4. The system as recited in claim 1, wherein the remote control device further comprises a display which displays an indication to an operator that EPL computer has received the first and second signals and executed the functions.

5. A remote control device for controlling an electronic price label (EPL) computer comprising:
   a first EPL circuit;
   a second EPL circuit; and
   a control circuit coupled between the first EPL circuit and the second EPL circuit for enabling transmission of alternating signals to the EPL computer by the first EPL circuit and the second EPL circuit;
   wherein the EPL computer executes a function in response to the alternating signals.

6. The device as recited in claim 5, further comprising an indicator which indicates to an operator that EPL computer has executed the function.

7. The device as recited in claim 5, wherein the remote control device further comprises a display which displays an indication to an operator that EPL computer has executed the function.

8. A method of remotely causing an electronic price label (EPL) computer to execute a function comprising the steps of:
   transmitting alternating signals from first and second EPL circuits to the EPL computer; and
   executing the function by the EPL computer in response to receipt of the alternating signals.

9. The method as recited in claim 8, further comprising the step of:
   transmitting a message to the first EPL circuit which advises an operator that the EPL computer has executed the function.

10. A method of remotely causing an electronic price label (EPL) computer to execute a number of functions comprising the steps of:
   (a) maintaining a function list by the EPL computer containing the functions to be executed;
   (b) transmitting a first signal to the EPL computer by a first EPL circuit;

(c) executing one function in the function list by the EPL computer in response to the first signal;

(d) transmitting a second signal to the EPL computer by a second EPL circuit;

(e) executing another function in the function list sequentially following the one function by the EPL computer in response to the second signal; and (f) repeating step pairs (b), (c) and (d),(e) until the number of functions has been sequentially executed by the EPL computer.

11. A method of remotely causing an electronic price label (EPL) computer to execute a number of functions comprising the steps of:

(a) maintaining a function list by the EPL computer containing the functions to be executed;

(b) transmitting a first signal to the EPL computer by a first EPL circuit;

(c) executing one function in the function list by the EPL computer in response to the first signal;

(d) transmitting a message to the first EPL circuit which advises an operator that the EPL computer has executed the one function;

(e) transmitting a second signal to the EPL computer by a second EPL circuit;

(f) executing another function in the function list sequentially following the one function by the EPL computer in response to the second signal; and (g) transmitting a message to the first EPL circuit which advises an operator that the EPL computer has executed the other function; and (h) repeating step pairs (b), (c) and (d),(e) until the number of functions has been sequentially executed by the EPL computer.

* * * * *